United States Patent [19]

Freitas

[11] Patent Number: 5,801,896
[45] Date of Patent: Sep. 1, 1998

[54] METHOD AND APPARATUS FOR SERVO PULSE DETECTION WITH HIGH AC COUPLING AND LARGE PULSE ASYMMETRY

[75] Inventor: David Anthony Freitas, Morgan Hill, Calif.

[73] Assignee: International Business Machines Corporation, Armonk, N.Y.

[21] Appl. No.: 869,378

[22] Filed: Jun. 5, 1997

Related U.S. Application Data

[63] Continuation of Ser. No. 397,593, Mar. 2, 1995, abandoned.

[51] Int. Cl.[6] .................................................. G11B 5/596
[52] U.S. Cl. ............................. 360/77.08; 360/77.02; 360/51
[58] Field of Search .................. 360/77.08, 77.05, 360/78.14, 77.02, 77.07, 46, 53, 51; 375/340, 341, 290, 263, 345

[56] References Cited

U.S. PATENT DOCUMENTS

| | | |
|---|---|---|
| 4,516,162 | 5/1985 | West .................................. 360/25 |
| 4,783,705 | 11/1988 | Moon et al. ....................... 360/77.08 |
| 4,823,212 | 4/1989 | Knowles et al. ................... 360/77.08 |
| 5,041,926 | 8/1991 | Ockerse et al. ................... 360/77.05 |
| 5,357,378 | 10/1994 | Urakawa ............................. 360/46 |
| 5,477,103 | 12/1995 | Romano et al. ............... 360/77.08 X |

FOREIGN PATENT DOCUMENTS 58-62870  4/1983  Japan ............................. G11B 21/10

*Primary Examiner*—Aristotelis M. Psitos
*Assistant Examiner*—Larry T. Cullen
*Attorney, Agent, or Firm*—Baker Maxham Jester & Meador

[57] ABSTRACT

Track information decoding circuitry of a data storage device servo control system decodes binary track information in a readback servo signal by detecting opposite polarity track information pulse pairs so as to produce a track information signal "one" bit if the presence of an opposite polarity pulse pair is detected and produce a track information signal "zero" bit in the absence of an opposite polarity pulse pair, wherein a one bit is produced only if there has been detected a second pulse of a readback signal pulse pair having a magnitude greater than a predetermined threshold value and having a correct polarity. The polarity of the last di-bit of the servo signal AGC field can be used to set the polarity in the pulse qualification process. Alternatively, a pulse detecting circuit at disk start-up decodes the readback signal first assuming a positive leading di-bit pulse and then assuming a negative leading di-bit pulse, determines the number of errors associated with each assumption, and selects the di-bit pulse polarity for further decoding that produced the decoded information having fewer errors.

31 Claims, 12 Drawing Sheets

10 MHZ DIBIT PATTERN WITH ASYMMETRY WITH AC COUPLING

METHOD AND APPARATUS FOR SERVO PULSE DETECTION WITH HIGH AC COUPLING AND LARGE PULSE ASYMMETRY

This application is a continuation of application Ser. No. 08/397,593, filed Mar. 2, 1995, now abandoned.

BACKGROUND OF THE INVENTION

1. Field of the Invention

This invention relates generally to data storage device servo control systems and, more particularly, to track information pulse detection systems for decoding servo control track information used for positioning the heads of data storage devices across the surface of a moving storage medium.

2. Description of the Related Art

In conventional computer data storage systems having a rotating storage medium, such as a magnetic or magneto-optical disk, user data is stored in a series of concentric or spiral tracks across the surface of the disk. The data comprises a series of variations in disk surface magnetic orientation recorded laterally in the tracks. A magnetic read/write head suspended over the disk surface transduces the variations in magnetic orientation and produces a readback signal. The variations in magnetic orientation, generally comprising reversals of magnetic flux, represent binary digits of ones and zeroes that in turn represent user data. The magnetic read/write head detects the variations in magnetic orientation and generates the readback signal as the disk rotates relative to the read/write head at thousands of revolutions per minute.

Reading and recording data in a desired one of the tracks requires knowledge of the track over which the read/write head is positioned and requires precise centering of the read/write head over the track as the disk rotates. Conventionally, the read/write head is mounted on a disk arm that is moved by a servo. A disk drive servo control system controls movement of the arm radially across the disk to move the read/write head from track to track in a seek operation and, once over a selected track, to maintain the head in a path centered over the track in a track-following operation.

A servo control system moves the read/write head to a desired track and then maintains the head centered over the track by reading servo information from the disk surface. The servo information comprises a pattern of high-frequency magnetic flux transitions, generally flux reversals, that are pre-recorded in the tracks at the time of disk manufacture. A servo read head, which can be either the same head used for reading the binary user data or can be a dedicated servo head, transduces the servo information and produces a servo readback signal.

The servo information includes encoded digital track data that identifies a track and includes a servo portion that provides an analog intra-track servo position signal. The magnitude of the analog servo position signal indicates the position of the read/write head relative to the track centerline and is used to generate a position error signal (PES). The servo control system uses the PES to control the disk arm servo and maintain the read/write head centered over a track. When the digital track data portion of the servo information is transduced, it provides track data such as the number of the track from which the servo pattern was read, the read/write head identification number, and the disk cylinder number.

A common method for providing servo information to a disk servo control system is known as the sector servo method. In the sector servo method, each disk surface is divided into generally radial sectors comprising relatively short servo information fields containing the track data and PES information and relatively longer data fields containing user data. The sector servo method advantageously provides design efficiencies in that a single read/write head is used to read the servo information and also to read and record user data from the disk. In addition, less of the total disk surface area is used for servo information as compared with other designs, such as those using a dedicated servo head. In this way, the sector servo method increases the storage media surface area available for recording data. The remaining description assumes a sector servo system, but it will be clear without further explanation to those skilled in the art how the description can be applied to dedicated servo systems.

The track data provided by the digital portion of the servo information field is useful during a seek operation, when the servo head is travelling too fast to demodulate the PES pattern or when the servo head position is otherwise known only to within the repetition of the PES pattern cycle and not in absolute track terms. That is, the track data should be valid at all off-track head locations as the servo head moves across the disk. Thus, the radial alignment between adjacent servo tracks must be very strictly controlled. The need to control radial alignment limits the recording frequency of the flux transitions comprising the servo information to considerably less than the recording frequency of the user data flux transitions.

Detecting the flux transitions making up the digital track data requires pulse detection circuitry in which pulses detected in the servo readback signal are converted into the binary digits making up the track data. In the servo readback signal path up to the pulse detection circuitry, there are generally three places where the signal is subject to some form of AC coupling. One AC coupling circuit is located between the read head and a read head preamplifier, the second is located between the preamplifier output and an automatic gain control circuit, and the last is located after the output of a low-pass filter.

Each of these coupling circuits act as a high-pass filter. That is, low-frequency signals below the corner frequency of the coupling circuits are interpreted as noise and are attenuated. Those skilled in the art will appreciate that a time constant is associated with each coupling circuit. This time constant determines how quickly the signal can be read after a low-frequency disturbance, such as a head switch. The effective corner frequency of the coupling circuits, also referred to as the coupling frequency, should be as high as possible to minimize the write-to-read recovery time for the read/write head and to minimize the head switch recovery time as read/write operations are moved from head to head of a data storage subsystem.

Magneto-resistive (MR) read/write heads are becoming more popular because they offer certain operational efficiencies and improved performance over conventional read/write head designs. Such a head is described, for example, in U.S. Pat. No. 3,908,194 to Romankiw issued Sep. 23, 1975, assigned to International Business Machines Corporation, and incorporated herein by this reference. With MR head designs, the dominant AC coupling frequency of the readback signal path is set by the coupling frequency of the coupling circuitry in the MR preamplifier, which restores and maintains the DC operating condition of the readback signal after a write operation and after switching heads. It should be apparent that the less write-to-read recovery time needed, the less the disk processing overhead becomes, permitting more user data to be stored on the disk. This effectively increases the storage capacity of the disk.

Unfortunately, MR heads have certain inherent asymmetric operating characteristics in that the readback signals they produce are not symmetric about a signal baseline, as they should be. Read/write heads having other designs might have asymmetry characteristics to a greater or lesser degree. The asymmetry of the MR head readback signal can make pulse detection difficult, especially with pulse detection systems designed for use with conventional read/write heads.

In some disk systems, binary digits of track information are encoded as di-bits, which generate a readback signal comprised of two pulses of opposite polarity separated by a minimum servo pattern spacing. The presence of a di-bit pulse pair represents a binary "one" bit and the absence of a di-bit pulse pair represents a binary "zero" bit. Thus, one track information bit is generated for every two readback di-bit pulses.

The relatively low frequency of the servo signal pulses due to radial alignment constraints, the high corner frequency of the AC coupling circuits, and the MR head asymmetry, make detection of di-bit pulses difficult.

From the discussion above, it should be apparent that there is a need for a pulse detection system that permits digital track data to be transduced and the pulses detected for accurate decoding of track data regardless of the relatively low recording frequency of the track information, the relatively high corner frequency of the coupling circuits, and the readback signal asymmetry. The present invention satisfies this need.

SUMMARY OF THE INVENTION

In accordance with the invention, pulse detecting circuitry of a servo control system constructed in accordance with the present invention detects opposite polarity di-bit pulse pairs in a readback servo signal, determines the polarity of the second di-bit pulse, and produces a track information signal "one" bit only in response to the second pulse of a servo data signal pulse pair having a magnitude greater than a predetermined threshold value. Qualifying a pulse pair by setting a threshold value reduces the effects of signal noise and qualifying a pulse pair by responding only to the second pulse of a pulse pair ensures accurate detection of the track information with high corner frequencies and signal asymmetry.

More particularly, setting the qualification of a di-bit pulse pair so that a pulse is not considered detected until this second pulse is encountered reduces the effects of signal overshoot from the readback head. In a typical track information pattern, an automatic gain control (AGC) field is followed by the digital track data. The AGC field typically comprises a sequence of opposite polarity pulse pairs such that the polarity of the second pulse of a track information di-bit is the same polarity as the last pulse of the AGC field. Therefore, in one aspect of the invention, a pulse detecting circuit determines the polarity of the last pulse of the AGC field and then uses that polarity in the track information pulse qualification process. This provides a pulse detection system that can accurately detect track information pulses whether the disk manufacturer uses a leading positive pulse for a di-bit or uses a leading negative pulse for a di-bit.

In another aspect of the invention, a pulse detecting circuit at disk start-up decodes the servo readback signal assuming a positive leading di-bit pulse and then decodes the servo readback signal assuming a negative leading di-bit pulse. The pulse detecting circuit then uses conventional error detection circuitry to determine the number of errors in the decoded information and selects the di-bit pulse polarity for further decoding that produced the decoded information having fewer errors. In this way, track information decoding proceeds quickly and accurately after a brief polarity setting process when power is initially applied to the disk data storage device.

Other features and advantages of the present invention should be apparent from the following description of the preferred embodiments, which illustrate, by way of example, the principles of the invention.

DESCRIPTION OF THE PREFERRED EMBODIMENTS

Figure 1:
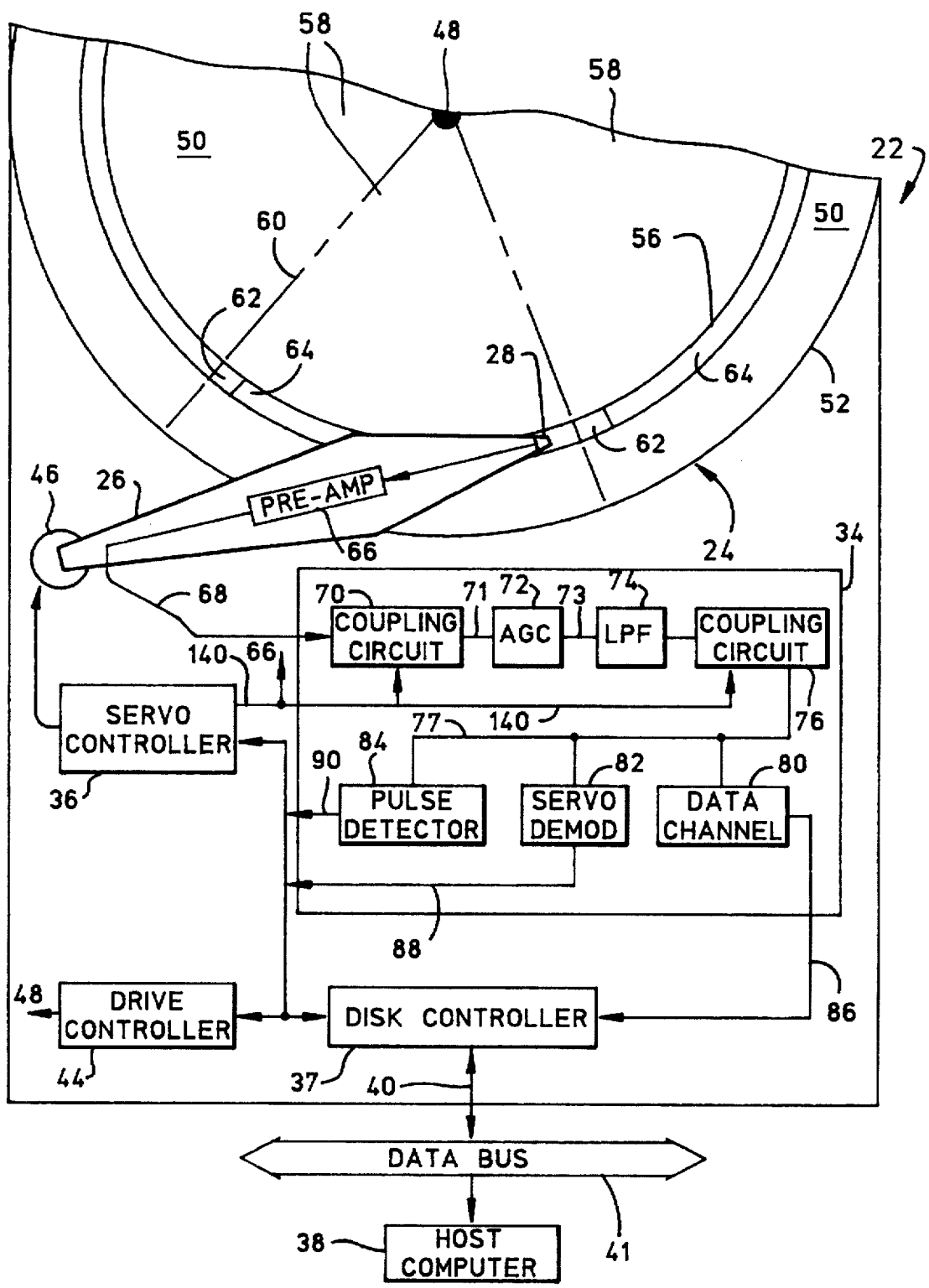
FIG. 1 is a schematic representation and block diagram of a disk drive storage system constructed in accordance with the present invention.

FIG. 1 illustrates a sector servo disk drive 20 having a servo control system 22 constructed in accordance with the present invention. The disk drive includes a disk 24 that is rotated and a disk arm 26 that is moved radially across the disk as user data is read and recorded from the disk by a read/write head 28. The head 28 also is used to read servo information from the disk. Pulse detection and demodulator circuitry of the servo control system receives a readback signal from the head 28 and detects servo information and recorded user data values in the readback signal. The circuitry decodes and demodulates the servo information, which includes digital track data having an automatic gain control (AGC) field followed by data including track number and the like, and the PES data.

In accordance with the present invention, the binary digits of the track data are encoded as di-bits, comprising two pulses of opposite polarity separated by a minimum servo pattern spacing, such that the presence of a di-bit pulse pair represents a binary "one" bit and the absence of a di-bit pulse pair represents a binary "zero" bit. The pulse detecting and decoding circuitry decodes the digital track data by producing a binary one bit only in response to the second pulse of a servo data signal di-bit pulse pair having a magnitude greater than a predetermined threshold value. Qualifying a di-bit pulse pair by setting a threshold value reduces the effects of signal noise and qualifying a pulse pair by responding to the second pulse of a pulse pair reduces the effects of signal asymmetry, reduces the effects of signal overshoot from the readback head, and permits the corner frequency of the coupling circuitry to be set at a higher frequency, improving the accuracy of pulse detection.

More particularly, pulse detection and servo demodulator circuitry is contained in a channel chip 34 of the servo control system 22. The detected and qualified pulses, comprising track identification information, are provided to a servo controller 36. The servo controller determines the number of the track over which the head 28 is located, and the location of the head within the track, through the servo information received from the channel chip 34. The information is provided to a disk controller 37, which receives requests for reading and recording data on the disk 24 from a host computer 38 over a data request line 40 via a data bus 41 and thereby determines a desired track number. From the track number corresponding to the requested data and the actual track over which the head 28 is located, the disk controller 37 generates control signals that are provided to the servo controller 36 and to a drive controller 44.

The servo controller 36 produces servo signals to control a servo 46, which moves the disk arm 26. The drive controller 44 controls a drive motor 48, which controls rotation of the disk 24. Those skilled in the art will understand that the disk comprises a magnetic storage medium 50 deposited on a substrate 52. It should be understood that the preferred embodiment will be described with reference to the sector servo system illustrated in FIG. 1 but that the teachings of the present invention apply equally well to dedicated servo systems and other storage systems using servo-controlled heads.

The servo information read by the read/write head 28 is recorded in tracks across the disk 24. In FIG. 1, a pair of circular, parallel lines designates a single servo track 56 of the disk. Only one servo track is shown in FIG. 1 for simplicity of illustration. A single servo track can include several repeated cycles of a servo pattern and can encompass multiple tracks of user data. FIG. 1 diagrammatically shows that the disk 24 is divided into sectors 58, whose boundaries are represented in the illustration by radial lines 60. FIG. 1 also shows that each track 56 includes a servo information field 62 followed by a data field 64. The analog readback signal generated by the read/write head 28 when it reads the track 56 comprises servo information when the head is over a servo information field 62 and comprises data channel information when the head is over a data field 64.

As the disk 24 is rotated relative to the magnetic read/write head 28, the head transduces the information recorded in the tracks and the servo control system moves the head from track to track in a seek operation and maintains the head centered over a desired track in a track following operation. That is, the head reads servo information recorded in the magnetic storage medium 50 at the time of disk manufacture by detecting changes in magnetic flux and generating appropriate signals. The disk controller 36 receives data read/write requests and determines the present track and destination track.

The readback signal produced by the head 28 is provided to a pre-amplifier 66 mounted on the disk arm 26. The pre-amplifier AC couples and amplifies the readback signal and provides the amplified signal over a pre-amplifier output line 68 to a coupling circuit 70 of the channel chip 34. The readback signal is next provided over an output line 71 to an automatic gain control (AGC) circuit 72 that adjusts the gain applied to the signal to maintain the signal amplitude within a range that is predetermined to simplify information processing, reduce noise, and improve system linearity. The amplified signal from the AGC circuit is provided over an AGC output line 72 to a low-pass filter (LPF) 74. Following the LPF, the readback signal is again AC coupled with a coupling circuit 76, after which the readback signal is provided over an output line 77 to a data channel circuit 80, servo demodulator 82, and pulse detector circuit 84 for proper processing.

The data channel circuit 80 transduces user data and provides its output over a data output line 86 to the data bus 41. The servo demodulator 82 provides its output over a servo output line 88 to the servo controller 36. The pulse detector circuit 84 provides qualified pulses to the servo controller over a pulse detector circuit output line 90.

Figure 2:
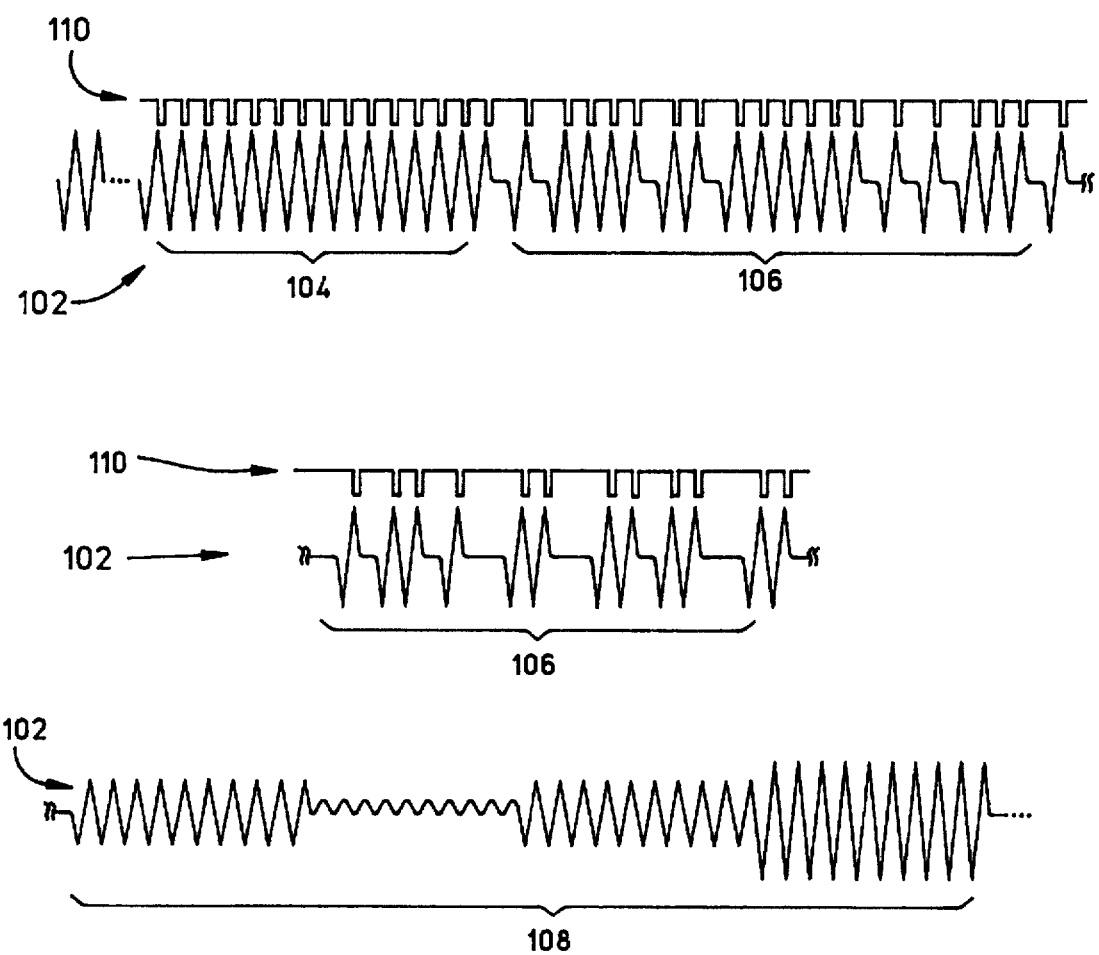
FIG. 2 is a signal waveform illustrating the readback signal produced by the read head illustrated in FIG. 1.

As noted above, the servo information includes digital track data having an AGC field followed by data including track number and the like, followed by PES data. FIG. 2 is a representation of the readback signal produced by the head 28 when it transduces the servo information recorded in the tracks. The readback signal 102 begins at the left top portion of FIG. 2, continues with the middle portion, and finishes with the bottom portion of FIG. 2. The signal 102 produced by the head is illustrated as a sequence of di-bits comprising pulse pairs of opposite polarity. An initial portion of the readback signal comprises an AGC field signal 104 containing pulse pairs spaced apart according to a minimum servo pattern spacing. The digital track information is the next portion of the readback signal 102. As illustrated in FIG. 2, the track information portion 106 of the signal comprises digital information and therefore is not a regularly repeating pattern, as compared with the AGC field. After the digital track information field, the servo information comprises the PES burst information signal 108. In FIG. 2, a digitized signal 110 is shown to represent the negative track information signal digital content. Thus, it can be seen that the absence of a di-bit pulse pair does not result in a binary "one" bit in the digitized data signal 110.

The readback signal 102 illustrated in FIG. 2 is shown perfectly symmetric. In the preferred embodiment, however, the read/write head 28 is a magneto-resistive (MR) head that inherently generates an asymmetric output signal. The preamplifier circuit 66 illustrated in FIG. 1 blocks the DC content of the readback signal and restores the signal baseline. A block diagram of the transconductance circuit is illustrated in FIG. 3.

Figure 3:
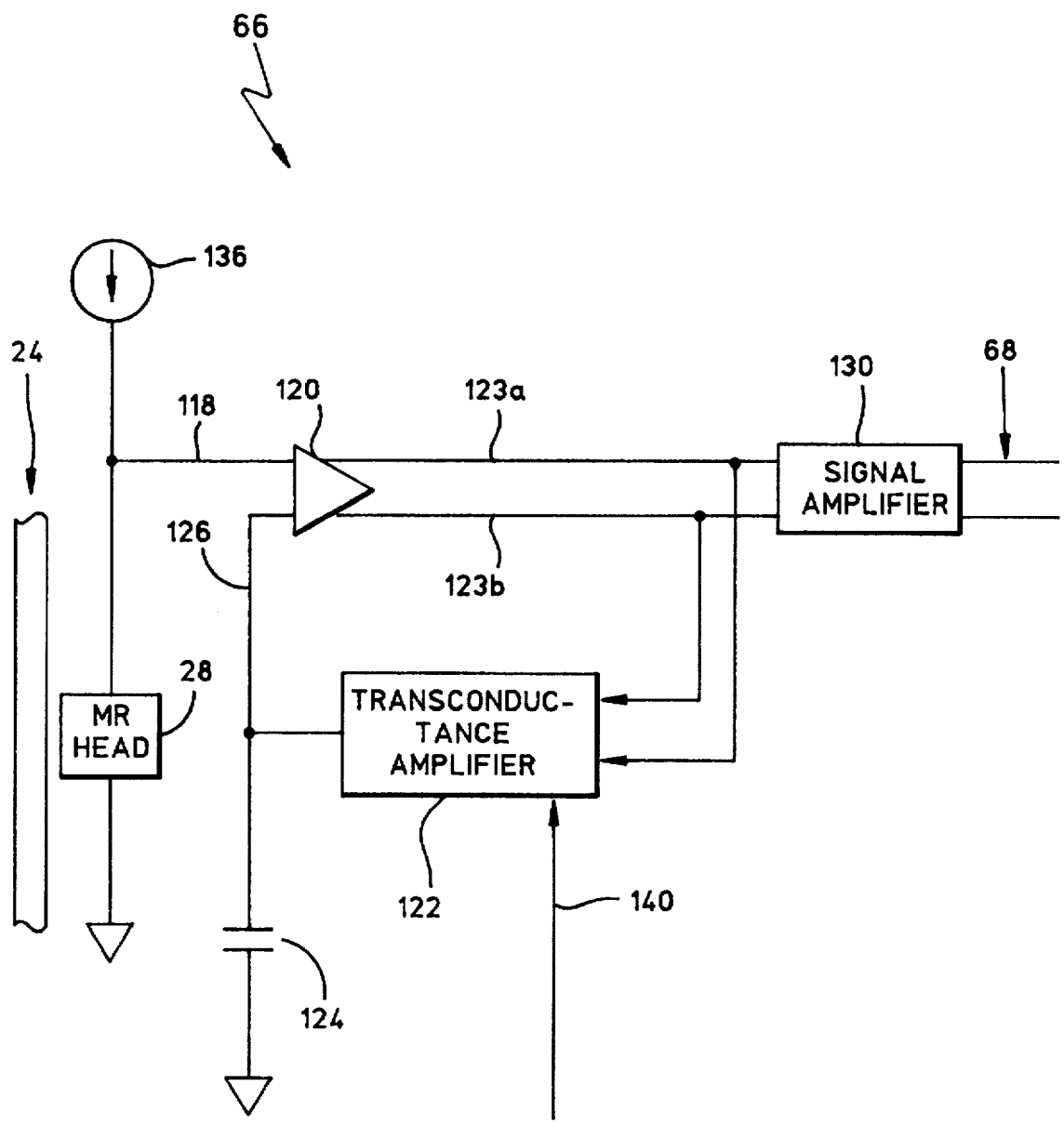
FIG. 3 is a block diagram of the preamplifier circuit illustrated in FIG. 1.

FIG. 3 shows that the readback signal from the MR head 28 is provided over a head output line 118 and is received by a differential amplifier 120 of the preamplifier circuit 66, which provides differential outputs 123a, 123b to a low-frequency transconductance amplifier 122. The transconductance amplifier sees any low frequency error, or difference, on the differential amplifier output lines 123a, 123b and attempts to compensate by either charging or discharging a capacitor 124. The signal line 126 from the transconductance amplifier into the differential amplifier matches a bias voltage on the MR head so that the voltage of the capacitor 124 matches the voltage 118 across the MR head, producing zero DC error through the amplifier 120. A current source 136 provides current for operation of the MR head 28 by setting the bias voltage across the head, as will be appreciated by those skilled in the art.

Thus, the differential amplifier 120-transconductance amplifier 122-capacitor 124 circuit acts like an AC coupling circuit, permitting high frequency signal components of the readback signal to pass and attenuating the unwanted low frequencies. The corner frequency of the coupling circuit is set by the gain of the transconductance amplifier and the capacitor value. The output from the differential amplifier is provided over the output lines 123a, 123b to a signal amplifier 130 and then over the preamplifier output line 68 to the channel chip 34 (FIG. 1). The output of the preamplifier circuit 66 as illustrated in FIG. 3 is shown to be a two-lead differential output. It will be understood by those skilled in the art that the other readback signal lines illustrated as single leads, such as shown in FIG. 1, also are differential output lines.

Figure 4:
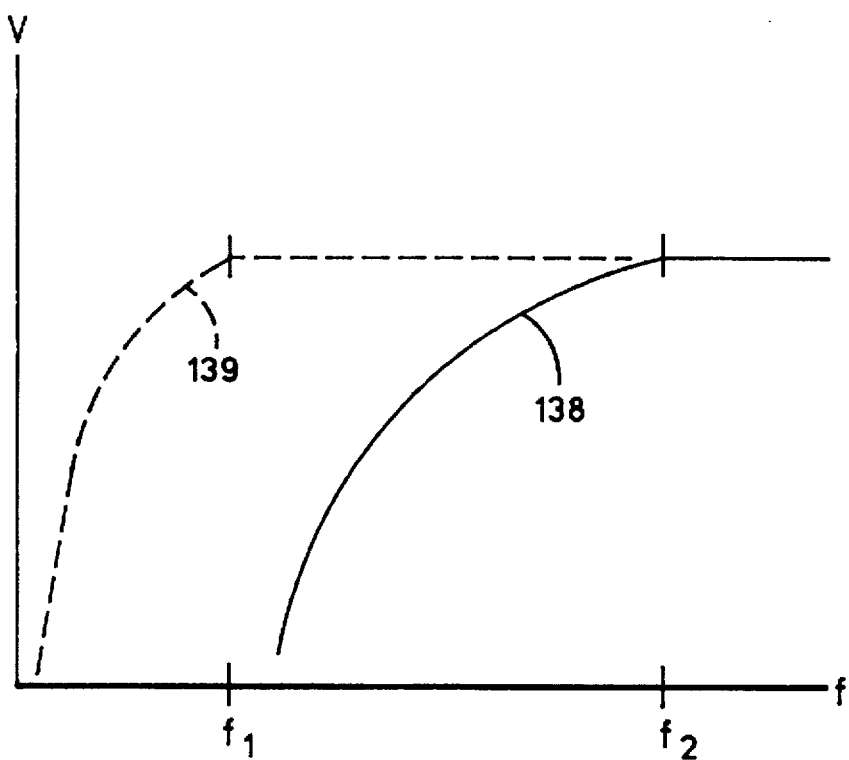
FIG. 4 is a diagram of the frequency response of the AC coupling circuits illustrated in FIG. 1, showing the effective corner frequency.

FIG. 4 illustrates the corner frequency for the coupling circuit of the MR preamplifier 66 and of the coupling circuits 70, 76 of the channel chip 34 with a solid line 138. Those skilled in the art will recognize the shape of the corner frequency function, which represents signal voltage on the vertical axis as a function of signal frequency on the horizontal axis. A conventional corner frequency function is represented with dashed lines 139 and an effective corner frequency $f_1$ that is much less than $f_2$. The corner frequency functions illustrate that the coupling circuits constructed in accordance with the present invention have a higher corner frequency than is conventionally possible. In an exemplary application, for example, $f_2$ might be 2 MHz and $f_1$ might be 500 KHz. The higher corner frequency $f_2$ permits reduced transition time between the servo signal and the data channel signal, which thereby provides improved format efficiency because it permits decreased gaps between the servo information field and the user data. This increases the amount of disk space available for storage of user data. Moreover, the higher corner frequency further attenuates any low frequency noise, which otherwise can cause errors in the readback signal.

Figure 5:
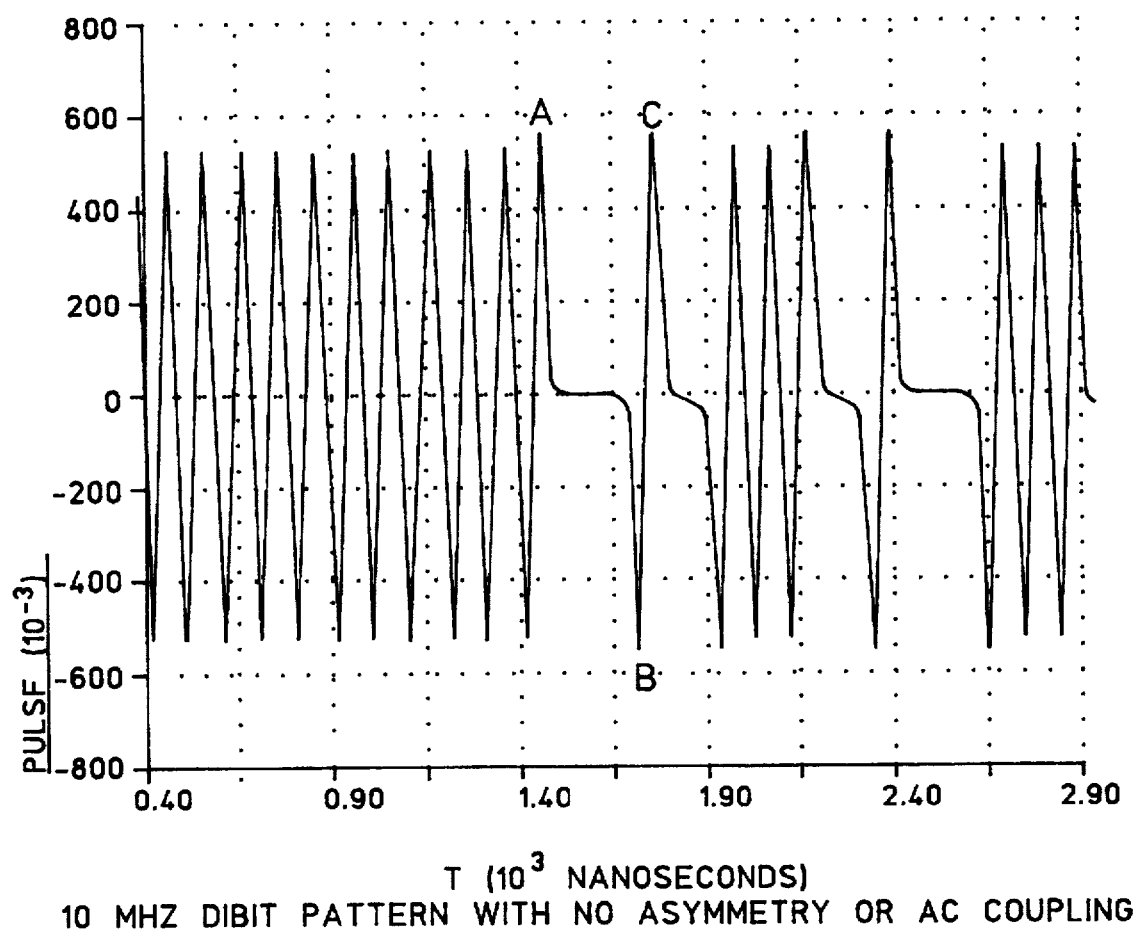
FIG. 5, FIG. 6, and FIG. 7 are representations of the di-bit signal produced by the read head illustrated in FIG. 1.

The servo information on the disk is recorded according to a di-bit representation wherein a di-bit comprises two pulses of opposite polarity separated by a minimum servo pattern spacing. FIG. 5 illustrates an enlarged section of the servo readback signal 102 illustrated in FIG. 2. In the enlarged signal representation of FIG. 5, a single di-bit pulse is pointed out, where B designates a negative pulse and C designates a positive pulse. Thus, the B-C pulse pair represents a single "one" bit of the track information. The pulse labelled A indicates the last pulse of a preceding AGC field. A conventional pulse detector detects a pulse peak whenever the derivative of a pulse signal crosses zero volts. The pulse peak is not considered a valid pulse unless the peak is qualified. The pulse peak is qualified only if the magnitude of the peak is greater than a threshold level. The threshold level is set sufficiently high to avoid false triggering from noise in the signal but is not set so high that a true pulse is missed. Conventionally, a di-bit pulse pair is detected to indicate a "one" bit of the track information.

Figure 6:
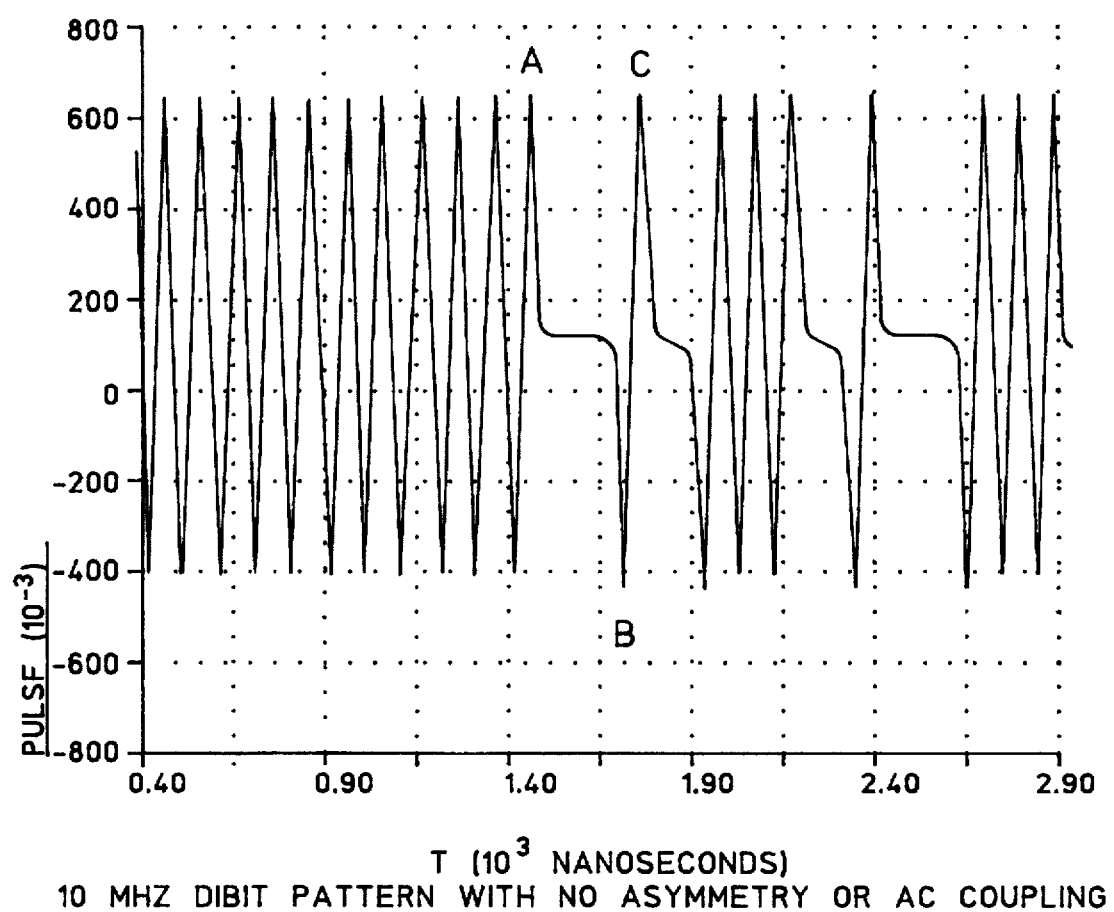

FIG. 6 shows a servo pattern signal as produced by the MR head 28 and illustrates the typical asymmetry produced by MR heads. Thus, it should be noted that the height of the negative pulse B above the zero base line is not as great in magnitude as the peak of the positive pulse C from the base line.

Figure 7:
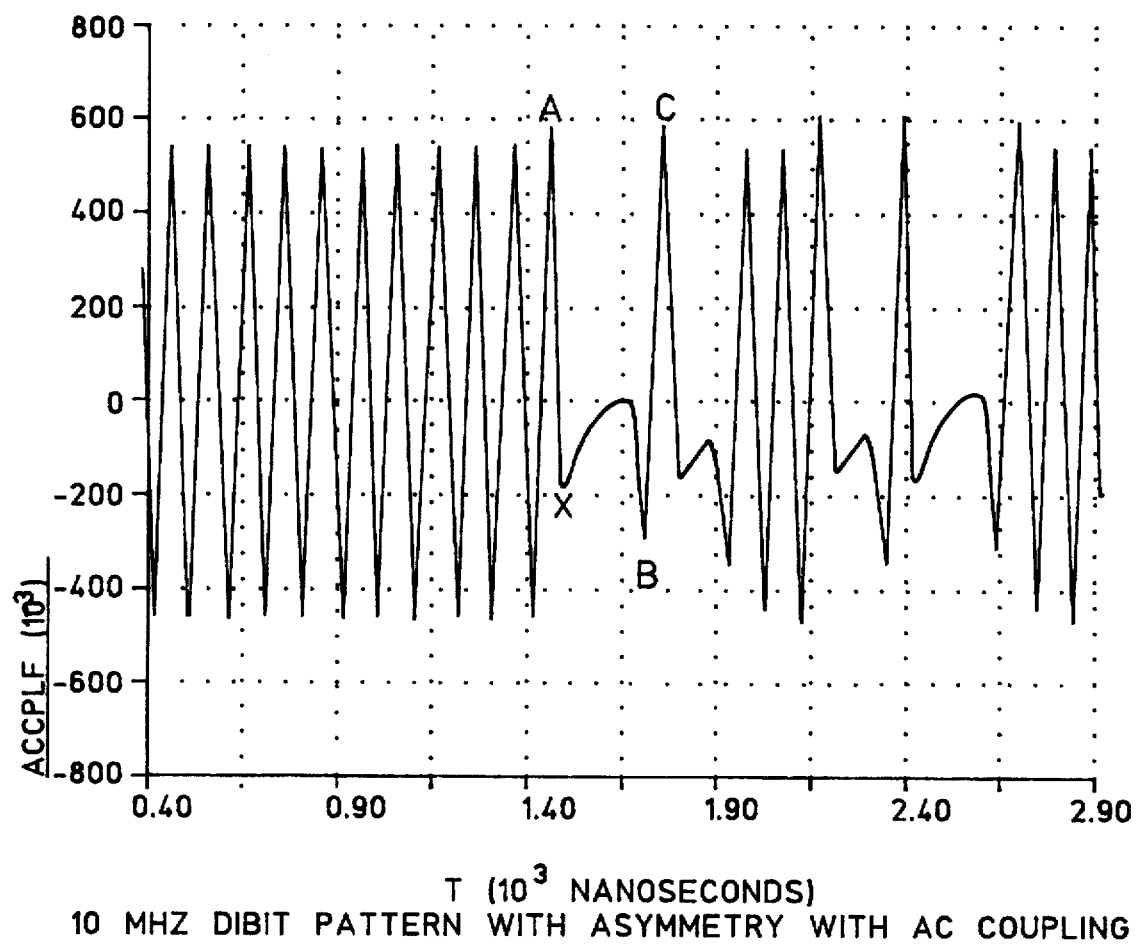

FIG. 7 is a representation of the servo readback signal showing the effects of the MR head asymmetry and the high effective corner frequency of the AC coupling circuits 70, 76 in the channel chip and the coupling of the preamplifier circuit 66. In the FIG. 7 representation, the corner frequency was set at one-fifth the fundamental frequency of the AGC field of the track information. The combination of the signal asymmetry and the AC coupling causes an overshoot in the signal that will occur after every pulse pair that is not immediately followed by another pulse pair. This is shown, for example, at the point marked "X" in FIG. 7. The asymmetry and AC coupling significantly reduce the amplitude of the leading pulse of a di-bit whenever a gap occurs in front of the di-bit. This is illustrated, for example, at the point B indicated in FIG. 7. It should be noted that any isolated flux transition will generate an overshoot, which is not unique to the di-bit pattern of transitions. The amplitude of an overshoot depends on the MR head asymmetry and the corner frequency of the circuit.

The effect of the signals illustrated in FIGS. 5, 6, and 7 are that conventional pulse detectors that qualify di-bit pulse pairs have difficulty utilizing a qualification threshold that will skip over a signal overshoot such as illustrated in FIG. 7 but will qualify a true di-bit pulse pair at the B pulse peak. Thus, the noise margin is considerably reduced, leaving the conventional pulse detector prone to detecting invalid pulses.

A pulse detection circuit in accordance with the present invention utilizes the fact that the servo readback signal overshoot and reduced amplitude of the leading di-bit pulse have the opposite polarity of the second pulse in a di-bit pulse pair. Therefore, pulse detection in accordance with the present invention determines polarity of the second pulse of a di-bit pulse pair and improves the noise margin by qualifying only the second pulse of each di-bit pulse pair.

The preferred embodiment utilizes the fact that the leading pulse of a di-bit pulse pair has the opposite polarity of the last pulse of the AGC field, while the second pulse of the first di-bit pulse has the same polarity as the last pulse in the AGC field. Therefore, in accordance with the present invention, pulse qualification occurs only with the di-bit pulse of a pulse pair having the same polarity as the last pulse of the AGC field.

Properly qualifying the di-bit polarity can be advantageously implemented in the pulse detector of the channel chip 34. Those skilled in the art will easily appreciate logic circuitry that can ensure only di-bit pulses having the same polarity as the last di-bit pulse of the write recovery field are detected. If the polarity of the second di-bit pulse is known, then the pulse detector can simply be set to detect only pulses of that polarity. If the channel chip is to be used in conjunction with disk drives having unknown polarity, then other alternative constructions are preferred, as described below.

In a first preferred embodiment, logic circuitry is included in the servo controller that determines the polarity of the last pulse of the AGC field. Discrete logic circuitry then selects the same polarity di-bit pulse of the track information for decoding the data.

Figure 8:
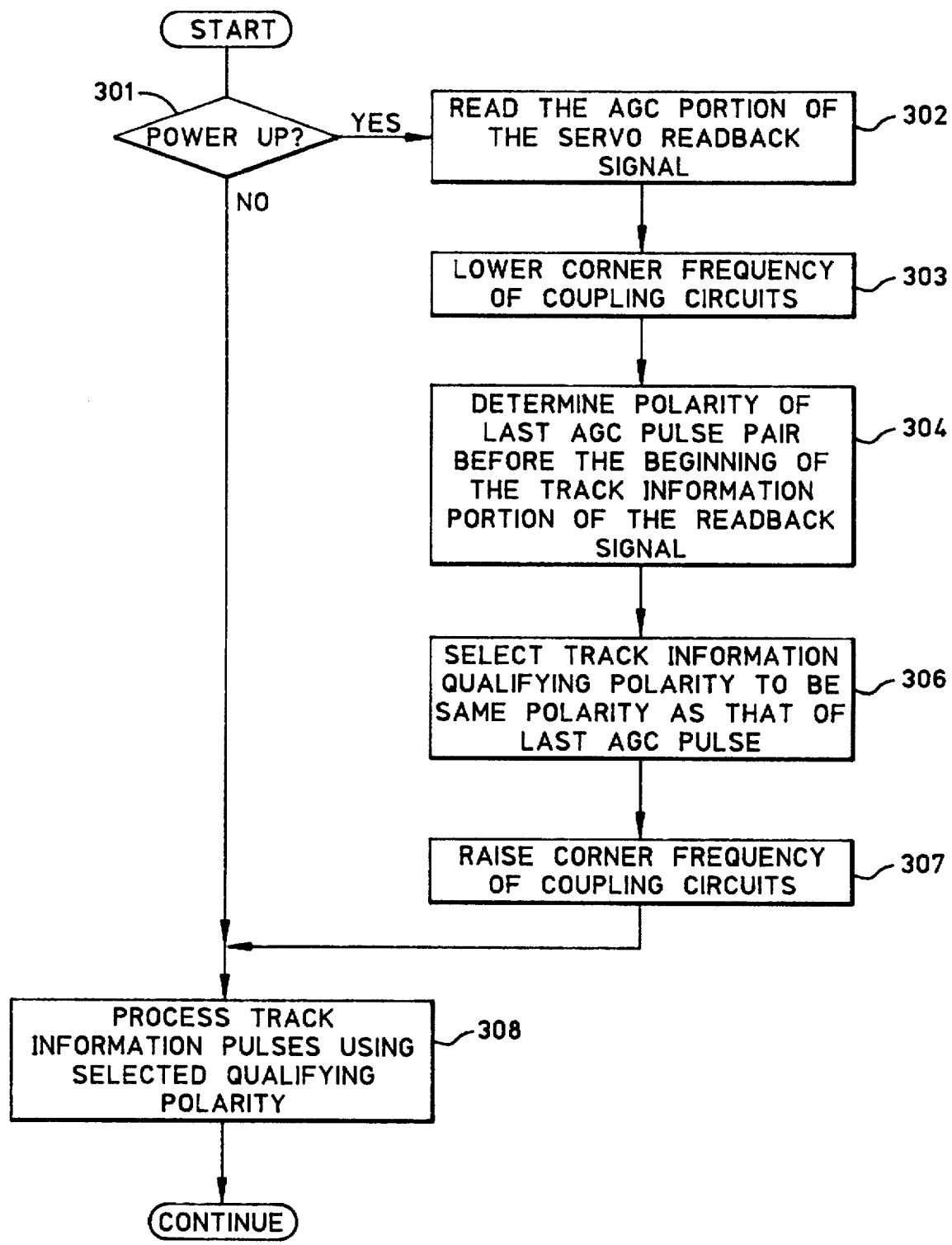
FIG. 8 is a flow diagram illustrating the operation of a pulse detection apparatus constructed in accordance with the present invention.

The operation of the servo controller will be better understood with reference to the flow diagram of FIG. 8. To avoid detecting an overshoot (such as illustrated in FIG. 7) from the AGC field as being a pulse transition of the track information, the coupling frequency is lowered temporarily to reduce the chance of detecting the overshoot. This screens out overshoot peaks from true pulse peaks. After the polarity of the last AGC pulse is determined, the coupling frequency is raised again. Thus, the servo controller begins processing by determining if operation is proceeding upon initial power-up, whenever power is applied to the disk drive, as indicated by the decision box numbered 301. Under the condition of initial power-up, the servo controller receives the AGC portion of the readback signal from the channel chip pulse detector output line 90, as represented by the flow diagram box numbered 302. In the next processing step, as represented by the flow diagram box numbered 303, the servo controller lowers the corner frequency of the coupling circuits 70, 76 of the channel chip 34 and the coupling circuit of the MR preamplifier 66.

Those skilled in the art will appreciate that the corner frequency of the coupling circuits can be changed simply by changing the time constant of the coupling circuits, and will appreciate that the time constant can be changed by sending a control signal to FET switches in the respective coupling circuits. In the preferred embodiment, the servo controller includes logic circuitry, such as stored in microcode, that sends appropriate control signals, as indicated by the FIG. 1 signal lines 140 from the servo controller 36 to the preamplifier 66 and the coupling circuits 70, 76. Construction details of the coupling circuits, which include coupling capacitors and FET switches, will be described further below.

After the corner frequency of the coupling circuits is lowered, the next step of servo controller processing is to determine the polarity of the last AGC pulse in the readback signal before the track information begins, as represented by the flow diagram box numbered 304. The servo controller microcode can determine the last AGC pulse because the expected number of AGC pulses is known. Thus, both the polarity and pulse of the readback signal must be known. As noted above, in the preferred embodiment, the last pulse of the AGC signal has the same polarity as the second pulse of a di-bit pulse pair. In the next processing step, represented by the flow diagram box numbered 306, the servo controller selects the di-bit pulse of the track information having the same polarity as the last AGC pulse.

After selecting the polarity that matches the second pulse of a di-bit pulse pair, the servo controller raises the corner frequency of the coupling circuits, as represented by the flow diagram box numbered 307. Processing then proceeds with the flow diagram box numbered 308, where the pulses of the following track information field are received and processed. After initial power-up, where the outcome of the first decision box 301 is negative, the corner frequencies need not be lowered and raised. Rather, the corner frequencies are left raised and the track information is detected using only the second pulse of a di-bit pulse pair. In this way, the effects of overshoot are avoided.

An alternative embodiment in accordance with the present invention includes logic circuitry in which the selection of the di-bit polarity for qualification of the pulses is made by analyzing the error rate of the decoded track information. That is, the servo readback signal is decoded using a first polarity as the qualifying polarity. The signal also is decoded using the opposite polarity as the qualifying polarity. Those skilled in the art will appreciate that conventional servo control systems include circuitry that determines the number of errors that occur during track information decoding. In accordance with this embodiment of the present invention, the error count for each qualifying polarity is compared and the polarity resulting in fewer errors is selected. Preferably, the polarity selection occurs when power is first applied to the servo control system of the disk drive. So long as power remains applied to the circuitry, no further selection of proper polarity is required. In this way, the servo control system selects the qualifying polarity that results in the fewest number of track information decoding errors, which necessarily will be the polarity that coincides with the polarity of the last di-bit pulse of the AGC write recovery field.

Figure 9:
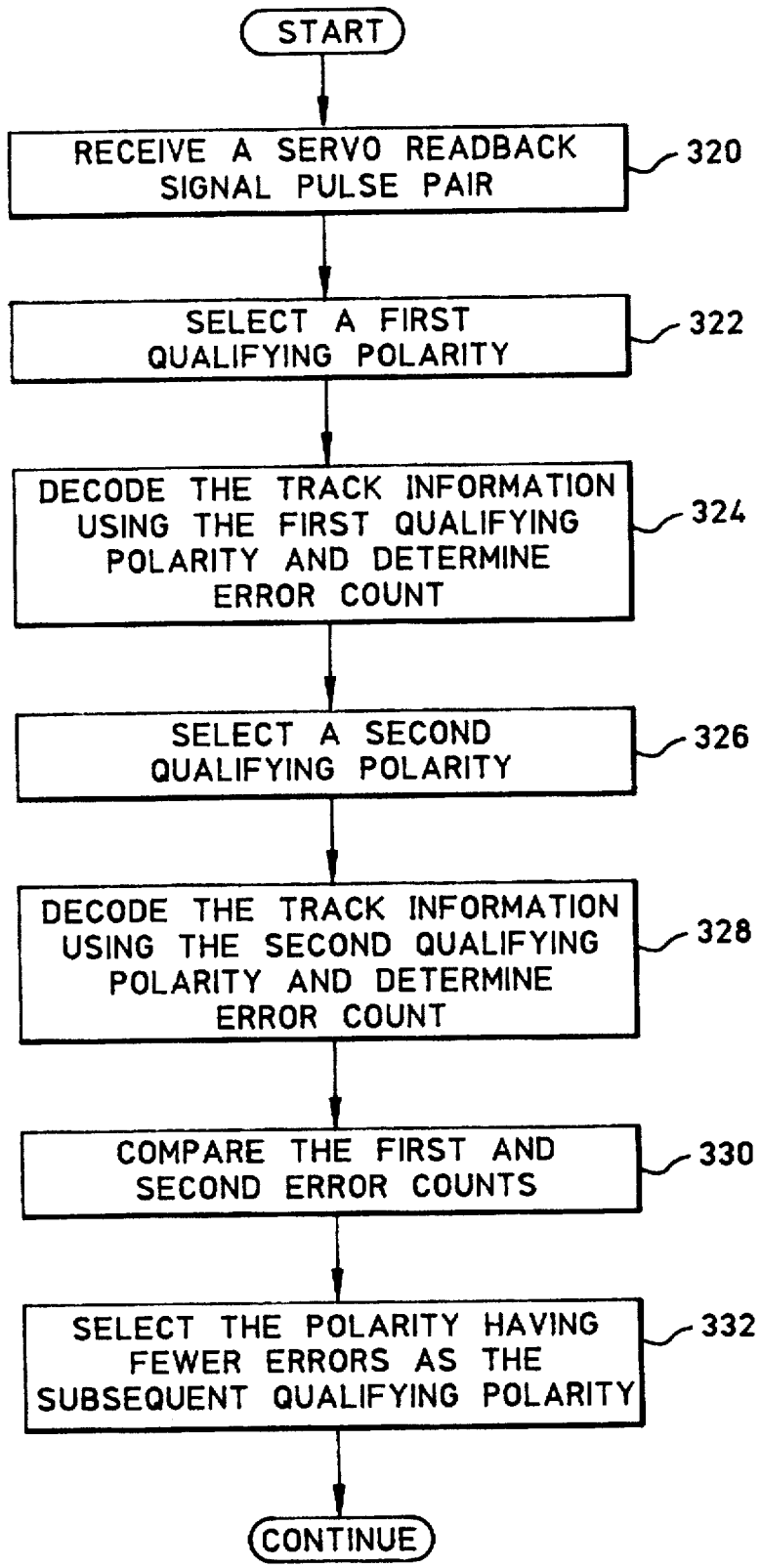
FIG. 9 is a flow diagram illustrating the operation of an alternative pulse detection apparatus constructed in accordance with the present invention.

The operation of the pulse detector that implements the error count processing will be better understood with reference to the flow diagram of FIG. 9. In the first step of processing, represented by the flow diagram box numbered 320, the pulse detector circuit receives a servo readback signal pulse pair. In the next step, a first qualifying polarity is selected, as shown by the box numbered 304. Next, the detector circuit decodes the track information using the first qualifying polarity. These steps are repeated for a second selected qualifying polarity, as represented by flow diagram boxes numbered 326 and 328. As known to those skilled in the art, servo control systems include circuitry (not illustrated) that automatically keeps count of the track information decoding errors produced during processing. At box 330, the first and second error counts are compared. Finally, at box 332, the pulse detector circuit selects the polarity that resulted in the fewer number of errors.

Figure 10:
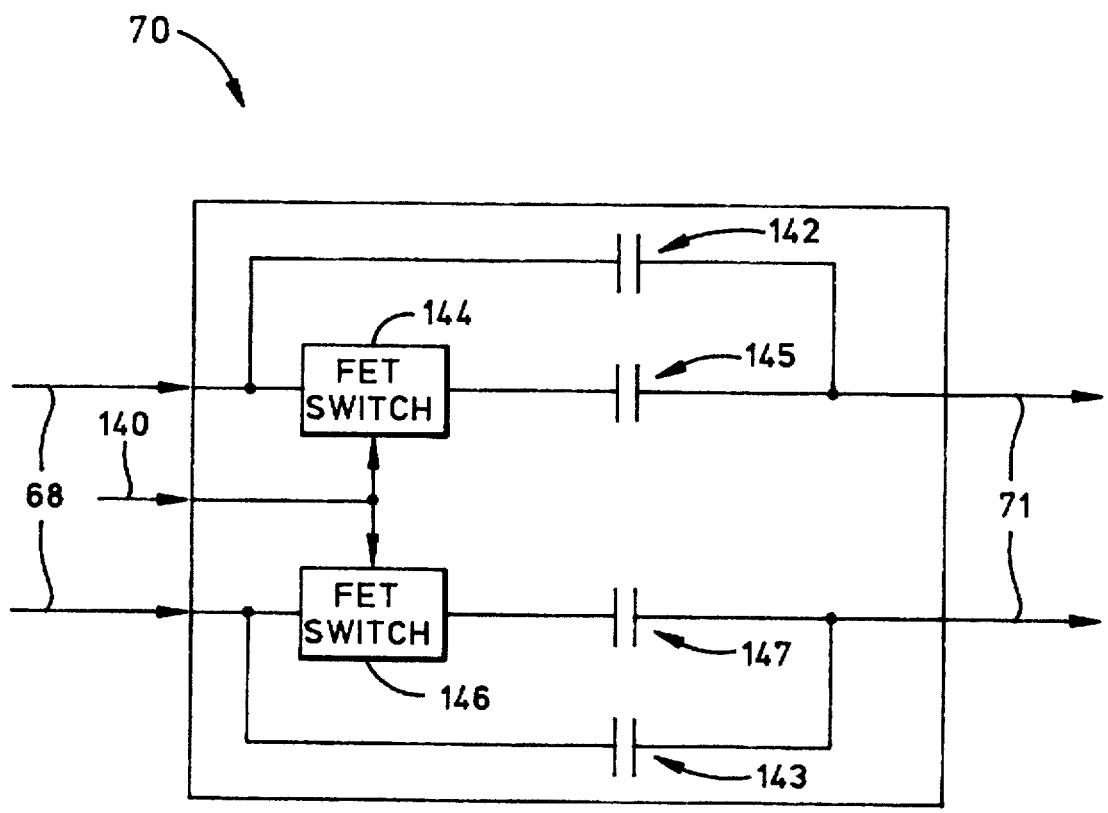
FIG. 10 is a block diagram of the coupling circuits illustrated in FIG. 1.

FIG. 10 shows a representative construction of one of the coupling circuits 70. The other coupling circuit 76 has a similar construction. As noted above, the corner frequency of the coupling circuits is controlled to reduce the chance of detecting readback signal overshoot as a peak. In the preferred embodiment, the corner frequency of the coupling circuits is changed simply by changing the time constant of the coupling circuits. FIG. 10 shows an exemplary construction of the coupling circuits in which coupling capacitors are selectively switched into and out of the signal path to adjust the time constant of the circuit. In FIG. 10, the readback signal is received over the coupling circuit differential lines 68 by respective coupling capacitors 142, 143 that are connected to the coupling circuit differential output lines 71. This provides one time constant, and associated corner frequency, for the circuit.

The readback signal also is received over the differential lines 68 by respective FET switch blocks 144, 146. Each FET switch 144, 146 responds to a control input signal received from the servo controller over the signal line 140 to either pass or block the readback signal from passing through additional coupling capacitors 145, 147, respectively, to the circuit differential output lines 71. Those skilled in the art will appreciate that each FET switch and capacitor pair together provide a different time constant for the circuit and thereby provide a second corner frequency.

As previously mentioned, the corner frequency of the preamplifier circuit 66 likewise is controlled by the servo controller 36. In the preamplifier, however, the corner frequency is controlled by adjusting the gain of the transconductance amplifier, which also can be achieved via the servo controller signal line 140 (see FIG. I and FIG. 3). Therefore, there is no need for separate FET switches and capacitors in the preamplifier to enable the servo controller to adjust the preamplifier effective corner frequency.

As noted above, the servo control circuit constructed in accordance with the present invention is intended for application in a system where it is known that the second pulse of a di-bit pulse pair is a positive pulse it is known that the last pulse of the AGC field signal is a positive pulse. Therefore, in accordance with adjusting the corner frequency of the coupling circuits, the preferred embodiment responds only to the second pulse of a di-bit pulse pair by detecting positive pulses of the track information readback signal.

Figure 11:
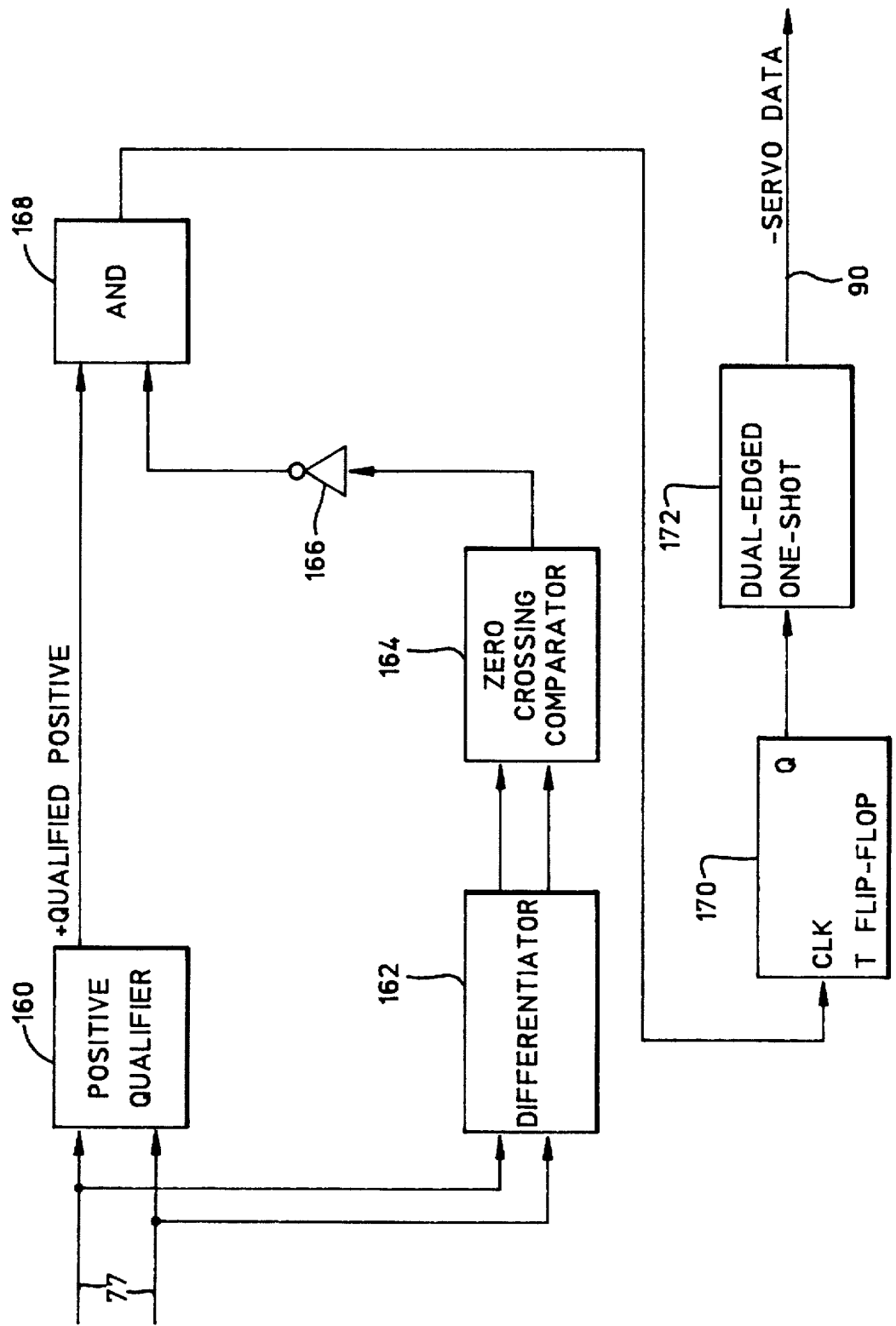
FIG. 11 is a block diagram of the pulse detector circuit illustrated in FIG. 1.

FIG. 11 shows an exemplary pulse detector circuit that detects positive pulses of the readback signal. The output from the last coupling circuit 76 is received over the lines 77 by a positive qualifier 160 that generates a "Qualified Positive" high signal if one of the differential signals is greater than a predetermined positive threshold. The readback signal differential outputs also are received by a differentiator 162 that differentiates the signal, producing a signal that changes sign when it detects a signal peak, and provides its output to a zero crossing comparator, which produces a high signal when its input is high and produces a low signal when its input is low. The differentiator and zero crossing comparator together generate a high to low transition with every positive peak of the input signal. To produce a positive output with positive peaks, their output is provided to an inverter 166. The output of the positive qualifier and the output of the inverter are input to an AND gate 168, which therefore acts as the final block in a qualification process that generates a high signal only for positive readback signal pulses that are above the predetermined threshold.

The output of the AND gate 168 is provided to the clock input of a T flip-flop 170, whose Q output line is tied to a dual-edged one-shot 172. The one-shot produces a single return-to-zero pulse for the second pulse of each di-bit pulse pair such that, for the readback signal 102 illustrated in FIG. 2, the negative data signal 110 is generated. In this way, the servo controller receives pulses that it will decode into track information data only in response to the second di-bit of readback signal pulse pairs. Those skilled in the art will appreciate that the illustrated embodiment of the pulse detector is exemplary and that other implementations of pulse detector circuitry may be equally workable.

In some systems, the polarity of the second pulse of a di-bit pulse pair might not be known in advance of circuit construction. In such a circumstance, it will be necessary to detect both positive and negative readback pulses. It will then be necessary to respond only to the second pulse of a di-bit pulse pair by selecting the appropriate pulse polarity of the track information readback signal. The selection can be made, for example, by the servo controller. An exemplary dual-polarity pulse detector is illustrated in FIG. 12.

Figure 12:
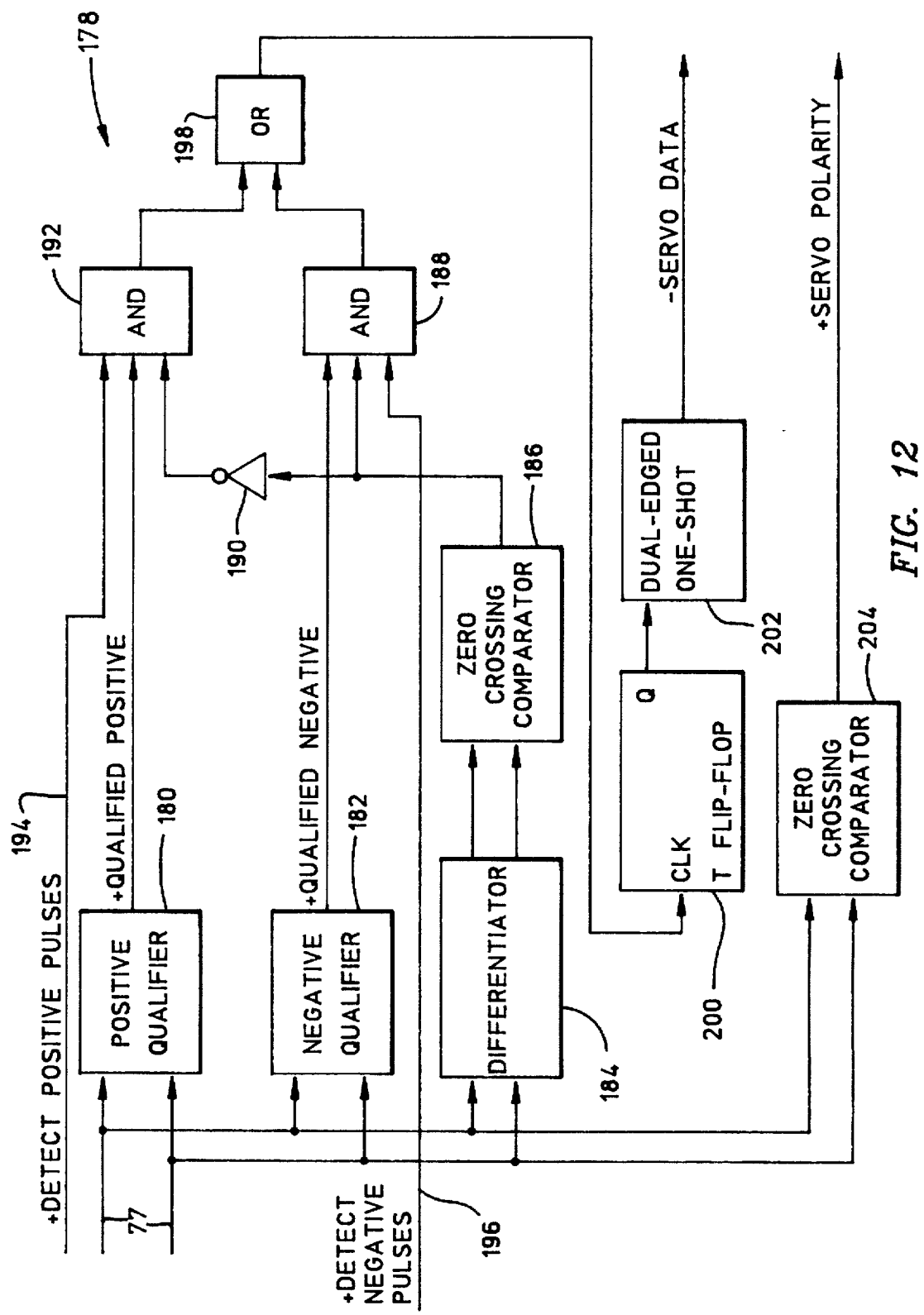
FIG. 12 is a block diagram of an alternative pulse detector circuit for use in the system illustrated in FIG. 1.

FIG. 12 shows that the pulse detector circuit 178 receives the readback signal over the differential lines 77 by a respective positive qualifier 180 and a negative qualifier 182. The positive qualifier 180 generates a high output if its input signal is greater than a predetermined positive threshold and the negative qualifier 182 generates a high output if its input signal is less than a predetermined negative threshold. The readback signal also is received by a dual-output differentiator block 184 that provides its signals to a zero crossing comparator 186 that changes output state with each respective signal peak it receives.

A signal peak is not considered valid unless it occurred during a signal that was qualified as greater than the positive threshold or less than the negative threshold value. Therefore, the output of the zero crossing comparator 186 is provided to a negative qualifier AND gate 188 and through an inverter 190 to a positive qualifier AND gate 192. To select between a positive or negative di-bit pulse, the pulse detector circuit 178 receives either a "Detect Positive Pulses" control signal or a "Detect Negative Pulses" control signal from the servo controller. The Detect Positive Pulses signal is a high signal that is received over a signal line 194 at the positive qualifier AND gate 192 and the Detect Negative Pulses signal is a high signal that is received over a signal line 196 at the negative qualifier AND gate 188. The output from the respective AND gates 188, 192 is provided to an OR gate 198 whose output goes high only if either a positive pulse was received and qualified or a negative pulse was received and qualified. The pulse detector circuitry described thus far therefore performs a qualification process that generates a pulse only for readback signal pulses that meet the respective predetermined threshold values.

The output of the OR gate 198 is provided to the clock input of a T flip-flop 200, whose Q output line is tied to a dual-edged one-shot 202. The one-shot produces a single return-to-zero pulse for each pulse. For example, assuming positive polarity is selected, the negative data signal 110 illustrated in FIG. 2 is generated in response to the readback signal 102 where the second di-bit pulse is a positive pulse. In this way, track information data will be decoded only in response to the second di-bit of readback signal pulse pairs.

Alternatively, it might be desirable to send out a pulse signal for both qualified positive readback signal pulses and negative readback signal pulses, and also to send out a polarity signal to indicate the polarity of the readback pulse. The servo controller, for example, can then receive both and make its selection. Such an operation would be followed by the servo controller processing steps illustrated in FIG. 9. In such a circumstance, the Detect Positive Pulses signal and the Detect Negative Pulses signal would be unnecessary (or would be fixed high) so that the output of both AND gates 188, 192 would be tied unconditionally to the OR gate 198. In addition, the readback signal would be provided over the differential output lines 77 to a second zero crossing comparator 204. The output of the second zero crossing comparator would be either positive or negative and would indicate whether the pulse produced by the one-shot 202 occurred when the readback pulse was positive or negative, respectively. Again, those skilled in the art will appreciate that the illustrated embodiment of the pulse detector is exemplary and that other implementations of pulse detector circuitry may be equally workable.

The present invention has been described above in terms of a presently preferred embodiment so that an understanding of the present invention can be conveyed. There are, however, many configurations for servo control circuits not specifically described herein but with which the present invention is applicable. The present invention should therefore not be seen as limited to the particular embodiment described herein, but rather, it should be understood that the present invention has wide applicability with respect to servo control circuits generally. All modifications, variations, or equivalent arrangements that are within the scope of the attached claims should therefore be considered to be within the scope of the invention.

I claim:

1. A servo control circuit comprising:

a preamplifier circuit that receives a pulsed readback signal and blocks the DC content and restores a predetermined signal baseline, thereby producing a conditioned readback signal, wherein the pulsed readback signal is generated by a device read head that transduces a servo pattern recorded in a servo track of a storage medium, the servo pattern comprises an authentic gain control (AGC) field of repeated first and second paired transitions having opposite polarity followed by one or more identification fields having opposite polarity paired transitions, and the pulsed readback signal includes an opposite polarity pulse pair corresponding to each opposite polarity transition pair of the servo pattern;

an automatic gain control circuit that receives the conditioned readback signal and automatically adjusts the signal magnitude to maintain the conditioned readback signal substantially within a predetermined amplitude range and thereby produce a gain adjusted readback signal; and a pulse detector circuit that receives the gain adjusted readback signal, detects opposite polarity pulse pairs, and produces a binary track information signal by decoding track information encoded in the readback signal such that the presence of an opposite polarity pulse pair results in a track information signal "one" bit and the absence of an opposite polarity pulse pair results in a track information signal "zero" bit, wherein the pulse detector circuit determines the polarity of the last readback signal pulse of the AGC field and produces a one bit if it detects a pulse of a readback signal opposite polarity pulse pair having a magnitude greater than a predetermined threshold value and having a polarity that is the same as the last readback signal pulse of the AGC field, which indicates it is the second pulse of the pulse pair, thereby producing a one bit of the track information signal regardless of the magnitude of the first pulse of the pulse pair, and otherwise produces a zero bit of the track information signal, which it then provides to a servo controller for position control of the device read head.

2. A servo control circuit as defined in claim 1, wherein the pulse detector circuit comprises:

a qualification circuit that receives the gain adjusted readback signal, detects opposite polarity pulse pairs, and produces a pulse for each readback signal pulse of the first polarity and produces a pulse for each readback signal pulse of the second polarity; and a logic circuit that receives the pulses from the qualification circuit and produces a track information signal one bit only if it detects a pulse having the same polarity as that of the last readback signal pulse of the AGC field.

3. A servo control circuit as defined in claim 1, wherein the pulse detector circuit comprises:

a qualification circuit that receives the gain adjusted readback signal, detects first and second opposite polarity pulse pairs, and produces a qualification pulse only if it qualifies one pulse of the first and second opposite polarity pulse pairs by detecting when one pulse of an opposite polarity pulse pair has a magnitude greater than a predetermined threshold value and has a polarity that is the same as that of the last readback signal pulse transduced from the AGC field; and a logic circuit that receives the qualification pulses from the qualification circuit and produces a track information signal one bit in response.

4. A servo control circuit as defined in claim 1, further including:

a servo control circuit that produces the binary track information signal during an initial set-up operating time interval by detecting a first polarity pulse of a readback signal pulse pair and a second polarity pulse of the readback signal pulse pair, decoding track information encoded in the readback signal according to the first polarity such that the presence of the first polarity pulse results in a track information signal "one" bit and the absence of the first polarity pulse results in a track information signal "zero" bit, decoding track information encoded in the readback signal according to the second polarity such that the presence of the second polarity pulse results in a track information signal "one" bit and the absence of the second polarity pulse results in a track information signal "zero" bit, determining an error count of decoding errors made according to the respective first polarity and second polarity, and selecting either the first polarity or the second polarity for subsequent pulse detector circuit processing in accordance with the readback signal pulse pair polarity that had the lesser determined error count.

5. A servo control circuit comprising:

a preamplifier circuit that receives a pulsed readback signal produced from a data storage device read head by transducing a servo data pattern of opposite polarity data transitions recorded at regular intervals in a servo track of a storage medium and processes the pulsed readback signal and thereby produces a conditioned readback signal with a blocked DC content and a restored predetermined signal baseline value;

an automatic gain control circuit that receives the conditioned readback signal and automatically adjusts the signal magnitude to maintain the conditioned readback signal substantially within a predetermined amplitude range and thereby produce a gain adjusted readback signal; and a pulse detector circuit that receives the gain adjusted readback signal, detects first and second opposite polarity pulses of the adjusted readback signal, and produces a binary track information signal by decoding digital track information encoded in the readback signal such that the presence of a first and second opposite polarity pulse pair results in a track information signal "one" bit and the absence of an opposite polarity pulse pair results in a track information signal "zero" bit, wherein the pulse detector circuit determines the polarity of the last readback signal pulse of the AGC field and produces a one bit of the track information signal if it detects that the second pulse of a readback signal opposite polarity pulse pair has a magnitude greater than a predetermined threshold value and has a polarity that is the same as the last readback signal pulse of the AGC field, which indicates it is the second pulse of the pulse pair regardless of the magnitude of the first pulse of the pulse pair, and otherwise produces a zero bit of the track information signal, which it then provides to a servo controller for position control of the device read head.

6. A servo control circuit as defined in claim 5, wherein the pulse detector circuit comprises:

a qualification circuit that receives the gain adjusted readback signal, detects opposite polarity pulse pairs, and produces a pulse for each readback signal pulse of the first polarity and produces a pulse for each readback signal pulse of the second polarity; and a logic circuit that receives the pulses from the qualification circuit and produces a track information signal one bit only in response to the second pulse of a readback signal pulse pair.

7. A servo control circuit as defined in claim 5, wherein the pulse detector circuit comprises:

a qualification circuit that receives the gain adjusted readback signal, detects first and second opposite polarity pulse pairs, and produces a qualification pulse only if it qualifies one pulse of a first and second pulse pair by detecting when either the first or second pulse has a magnitude greater than a predetermined threshold value and has a polarity that is the same as that of the last readback signal pulse transduced from the AGC field; and a logic circuit that receives the qualification pulses from the qualification circuit and produces a track information signal one bit in response.

8. A servo control circuit as defined in claim 5, further including:

a servo control circuit that produces the binary track information signal during an initial set-up operating time interval by detecting a first polarity pulse of a readback signal pulse pair and a second polarity pulse of the readback signal pulse pair, decoding track information encoded in the readback signal according to the first polarity such that the presence of the first polarity pulse results in a track information signal "one" bit and the absence of the first polarity pulse results in a track information signal "zero" bit, decoding track information encoded in the readback signal according to the second polarity such that the presence of the second polarity pulse results in a track information signal "one" bit and the absence of the second polarity pulse results in a track information signal "zero" bit, determining an error count of decoding errors made according to the respective first polarity and second polarity, and selecting either the first polarity or the second polarity for subsequent pulse detector circuit processing in accordance with the readback signal pulse pair polarity that had the lesser determined error count.

9. A track information decoding circuit for receiving a pulsed readback signal produced by transducing a servo pattern recorded in a servo track of a storage medium and decoding the readback signal to produce a binary track information signal, wherein the servo pattern comprises an automatic gain control (AGC) field of repeated first and second paired transitions having opposite polarity followed by one or more identification fields having opposite polarity paired transitions that represent bits of the digital track information signal and the readback signal includes an opposite polarity pulse pair corresponding to each opposite polarity transition pair of the servo pattern, the track information decoding circuit comprising:

a preamplifier circuit that receives the pulsed readback signal and adjusts the readback signal so as to produce a conditioned readback signal with a blocked DC content and a restored predetermined signal baseline value;

an automatic gain control circuit that receives the conditioned readback signal and automatically adjusts the signal magnitude to maintain the conditioned readback signal substantially within a predetermined amplitude range and thereby produce a gain adjusted readback signal; and a pulse detector circuit that receives the gain adjusted readback signal, detects opposite polarity pulse pairs, and produces bits of the track information signal such that the presence of an opposite polarity pulse pair results in a track information signal "one" bit and the absence of an opposite polarity pulse pair results in a track information signal "zero" bit, wherein the pulse detector circuit determines the polarity of the last readback signal pulse of the AGC field and produces a one bit if it detects the second pulse of a readback signal opposite polarity pulse pair having a magnitude greater than a predetermined threshold value and having a polarity that is the same as the last readback signal pulse of the AGC field, which indicates it is the second pulse of the pulse pair regardless of the magnitude of the first pulse of the pulse pair, and otherwise produces a zero bit of the track information signal.

10. A track information decoding circuit as defined in claim 9, wherein the pulse detector circuit comprises:

a qualification circuit that receives the gain adjusted readback signal, detects opposite polarity pulse pairs, and produces a pulse for each readback signal pulse of the first polarity and produces a pulse for each readback signal pulse of the second polarity; and a logic circuit that receives the pulses from the pulse detector circuit and produces a one bit of the track information signal only if it detects a pulse having the same polarity as that of the last readback signal pulse of the AGC field.

11. A track information decoding circuit as defined in claim 9, wherein the pulse detector circuit comprises:

a qualification circuit that receives the gain adjusted readback signal, detects opposite polarity pulse pairs, and produces a pulse for each readback signal pulse of the first polarity and produces a pulse for each readback signal pulse of the second polarity; and a logic circuit that receives the pulses from the qualification circuit and produces a one bit of the track information signal only if the detected pulse is the second pulse of a readback signal pulse pair.

12. A track information decoding circuit as defined in claim 9, wherein the pulse detector circuit comprises:

a qualification circuit that receives the gain adjusted readback signal, detects first and second opposite polarity pulse pairs, and produces a qualification pulse only if it detects that either a first or second pulse pair has a magnitude greater than a predetermined threshold value and has a polarity that is the same as that of the last readback signal pulse transduced from the AGC field; and a logic circuit that receives the qualification pulses from the qualification circuit and produces a one bit of the track information signal in response.

13. A track information decoding circuit as defined in claim 9, further including:

a servo control circuit that produces the binary track information signal during an initial set-up operating time interval by detecting a first polarity pulse of a readback signal pulse pair and a second polarity pulse of the readback signal pulse pair, decoding track information encoded in the readback signal according to the first polarity such that the presence of the first polarity pulse results in a track information signal "one" bit and the absence of the first polarity pulse results in a track information signal "zero" bit, decoding track information encoded in the readback signal according to the second polarity such that the presence of the second polarity pulse results in a track information signal "one" bit and the absence of the second polarity pulse results in a track information signal "zero" bit, determining an error count of decoding errors made according to the respective first polarity and second polarity, and selecting either the first polarity or the second polarity for subsequent pulse detector circuit processing in accordance with the readback signal pulse pair polarity that had the lesser determined error count.

14. A servo control system for positioning a read head adjacent a surface of a storage medium for transducing a servo pattern comprising binary digits recorded in at least one track on the storage medium surface, the system comprising:

a preamplifier circuit that receives a readback signal from the read head produced by transducing a servo pattern of binary digits, in which an automatic gain control (AGC) field of repeated first and second paired transitions having opposite polarity is followed by one or more identification fields of pulse transition pairs such that a pulse transition pair comprising a first polarity followed by a second polarity indicates the presence of a "one" bit and the absence of a pulse transition pair indicates a "zero" bit, and that blocks the DC content of the readback signal and restores a predetermined signal baseline so as to produce a conditioned readback signal;

an automatic gain control circuit that receives the conditioned readback signal and automatically adjusts the signal magnitude to maintain the conditioned readback signal substantially within a predetermined amplitude range and thereby produce a gain adjusted readback signal;

a pulse detector circuit that receives the gain adjusted signal and detects maximum and minimum values such that the pulse detector circuit produces a pulse when a maximum value is detected and produces a pulse when a minimum value is detected;

a data decoding circuit that receives the pulses from the pulse detector circuit, detects opposite polarity pulse pairs, and produces a binary track information signal by decoding digital track information encoded in the readback signal to produce bits of the track information signal such that the presence of an opposite polarity pulse pair results in a track information signal "one" bit and the absence of an opposite polarity pulse pair results in a track information signal "zero" bit, wherein the pulse detector circuit determines the polarity of the last readback signal pulse of the AGC field and produces a one bit if it detects a second pulse of a readback signal opposite polarity pulse pair having a magnitude greater than a predetermined threshold value and having a polarity that is the same as the last readback signal pulse of the AGC field, which indicates it is the second pulse of the pulse pair regardless of the magnitude of the first pulse of the pulse pair, and otherwise produces a zero bit of the track information signal, which it then provides to a servo controller for position control of the device read head;

a servo assembly that is activated to position the read head relative to the storage medium; and a servo controller that controls the servo assembly in accordance with the track information to position the read head.

15. A servo control system as defined in claim 14, wherein the pulse detector circuit comprises:

a qualification circuit that receives the gain adjusted readback signal, detects opposite polarity pulse pairs, and produces a pulse for each readback signal pulse of the first polarity and produces a pulse for each readback signal pulse of the second polarity; and a logic circuit that receives the pulses from the qualification circuit and produces a one bit of the track information signal only if it detects a pulse having the same polarity as that of the last readback signal pulse of the AGC field.

16. A servo control system as defined in claim 14, wherein the pulse detector circuit comprises:

a qualification circuit that receives the gain adjusted readback signal from the automatic gain control circuit, detects opposite polarity pulse pairs, and produces a pulse for each readback signal pulse of the first polarity and produces a pulse for each readback signal pulse of the second polarity; and a logic circuit that receives the pulses from the qualification circuit and produces a one bit of the track information signal only if the detected pulse is the second pulse of a readback signal pulse pair.

17. A servo control system as defined in claim 14, wherein the pulse detector circuit comprises:

a qualification circuit that receives the gain adjusted readback signal, detects first and second opposite polarity pulse pairs, and produces a qualification pulse only if it detects that either a first or second pulse has a magnitude greater than a predetermined threshold value and has a polarity that is the same as that of the last readback signal pulse transduced from the AGC field; and a logic circuit that receives the qualification pulses from the pulse detector circuit and produces a one bit of the track information signal in response.

18. A servo control system as defined in claim 14, wherein the servo controller comprises:

a control circuit that produces the binary track information signal during an initial setup operating time interval by detecting a first polarity pulse of a readback signal pulse pair and a second polarity pulse of the readback signal pulse pair, decoding track information encoded in the readback signal according to the first polarity such that the presence of the first polarity pulse results in a track information signal "one" bit and the absence of the first polarity pulse results in a track information signal "zero" bit, decoding track information encoded in the readback signal according to the second polarity such that the presence of the second polarity pulse results in a track information signal "one" bit and the absence of the second polarity pulse results in a track information signal "zero" bit, determining an error count of decoding errors made according to the respective first polarity and second polarity, and selecting either the first polarity or the second polarity for subsequent pulse detector circuit processing in accordance with the readback signal pulse pair polarity that had the lesser determined error count.

19. A data storage disk drive comprising:

a storage media disk with a recording material deposited on a surface of the disk and on which is recorded at least one data track containing a servo pattern comprising an automatic gain control (AGC) field of repeated first and second paired transitions having opposite polarity followed by one or more identification fields having opposite polarity paired transitions;

a read head that transduces the servo pattern contained in the data track and produces a disk analog readback signal as the disk is rotated, wherein the readback signal includes an opposite polarity pulse pair corresponding to each opposite polarity transition pair of the servo pattern;

a servo that moves the read head relative to the surface of the storage media disk;

a servo control circuit comprising:

a preamplifier circuit that receives the disk analog readback signal and blocks the DC content of the signal and restores a predetermined signal baseline value so as to produce a conditioned readback signal, an automatic gain control circuit that receives the conditioned readback signal and automatically adjusts the signal magnitude to maintain the conditioned readback signal substantially within a predetermined amplitude range and thereby produce a gain adjusted readback signal, and a pulse detector circuit that receives the gain adjusted readback signal, detects opposite polarity pulse pairs, and produces a binary track information signal by decoding digital track information encoded in the readback signal such that the presence of an opposite polarity pulse pair results in a track information signal "one" bit and the absence of an opposite polarity pulse pair results in a track information signal "zero" bit, wherein the pulse detector circuit determines the polarity of the last readback signal pulse of the AGC field and produces a one bit if it detects a pulse of a readback signal pulse pair having a magnitude greater than a predetermined threshold value and having a polarity that is the same as that of the last readback signal pulse of the AGC field regardless of the magnitude of the other pulse of the pulse pair, and otherwise produces a zero bit of the track information signal; and a servo controller that receives the track information from the track information decoder circuit and controls the servo such that the servo positions the read head over the storage media disk.

20. A data storage disk drive as defined in claim 19, wherein the pulse detector circuit comprises:

a qualification circuit that receives the gain adjusted readback signal, detects opposite polarity pulse pairs, and produces a pulse for each readback signal pulse of the first polarity and produces a pulse for each readback signal pulse of the second polarity; and a logic circuit that receives the pulses from the qualification circuit and produces a one bit of the track information signal only if it detects a pulse having the same polarity as that of the last readback signal pulse of the AGC field.

21. A data storage disk drive as defined in claim 19, wherein the pulse detector circuit comprises:

a qualification circuit that receives the gain adjusted readback signal, detects opposite polarity pulse pairs, and produces a pulse for each readback signal pulse of the first polarity and produces a pulse for each readback signal pulse of the second polarity; and a logic circuit that receives the pulses from the qualification circuit and produces a one bit of the track information signal only if the detected pulse is the second pulse of a readback signal pulse pair.

22. A data storage disk drive as defined in claim 19, wherein the pulse detector circuit comprises:

a qualification circuit that receives the gain adjusted readback signal, detects first and second opposite polarity pulse pairs, and produces a qualification pulse only if it detects that either a first or second pulse has a magnitude greater than a predetermined threshold value and has a polarity that is the same as that of the last readback signal pulse transduced from the AGC field; and a logic circuit that receives the qualification pulses from the qualification circuit and produces a one bit of the track information signal in response.

23. A data storage disk drive as defined in claim 19, wherein the servo controller comprises:

a control circuit that produces the binary track information signal during an initial setup operating time interval by detecting a first polarity pulse of a readback signal pulse pair and a second polarity pulse of the readback signal pulse pair, decoding track information encoded in the readback signal according to the first polarity such that the presence of the first polarity pulse results in a track information signal "one" bit and the absence of the first polarity pulse results in a track information signal "zero" bit, decoding track information encoded in the readback signal according to the second polarity such that the presence of the second polarity pulse results in a track information signal "one" bit and the absence of the second polarity pulse results in a track information signal "zero" bit, determining an error count of decoding errors made according to the respective first polarity and second polarity, and selecting either the first polarity or the second polarity for subsequent pulse detector circuit processing in accordance with the readback signal pulse pair polarity that had the lesser determined error count.

24. A method of decoding track information in a readback signal produced by a read head as it transduces data recorded in a track of a storage medium, wherein the track includes servo data having both an automatic gain control (AGC) field and one or more track information fields, the method comprising the steps of:

adjusting the readback signal so as to produce a conditioned readback signal having a blocked DC content and a restored predetermined signal baseline value, wherein the readback signal is generated by a device read head from transducing a servo pattern recorded in a servo track of a storage medium, the servo pattern comprises an AGC field of repeated first and second paired transitions having opposite polarity followed by one or more identification fields having opposite polarity paired transitions, and the readback signal includes an opposite polarity pulse pair corresponding to each opposite polarity transition pair of the servo pattern;

adjusting the gain of the conditioned readback signal to maintain the signal substantially within a predetermined amplitude range and thereby producing a gain adjusted readback signal; and detecting opposite polarity pulse pairs in the gain adjusted readback signal and decoding digital track information encoded in the readback signal so as to compare the polarity of the opposite polarity pulse pairs with the polarity of the last readback signal pulse of the AGC field and produce a track information signal "one" bit if the presence of an opposite polarity pulse pair is detected and producing a track information signal "zero" bit in the absence of an opposite polarity pulse pair, wherein a one bit is produced if there has been detected a second pulse of a readback signal pulse pair having a magnitude greater than a predetermined threshold value and having a polarity that is the same as the last readback signal pulse of the AGC field which indicates it is the second pulse of the pulse pair regardless of the magnitude of the first pulse of the pulse pair.

25. A method of decoding track information as defined in claim 24, wherein the step of detecting opposite polarity pulse pairs comprises the steps of:

producing a pulse for each detected readback signal pulse of the first polarity and producing a pulse for each detected readback signal pulse of the second polarity; and producing a track information signal one bit only if the detected pulse is the second pulse of a readback signal pulse pair.

26. A method of decoding track information as defined in claim 24, wherein the step of detecting opposite polarity pulse pairs comprises the steps of:

detecting the first and second opposite polarity pulse pairs and producing a pulse only if either the first or second pulse pair has a magnitude greater than a predetermined threshold value and has a polarity that is the same as that of the last readback signal pulse transduced from the AGC field; and producing a track information signal one bit in response to a received pulse.

27. A data storage system comprising:

a storage medium having a servo pattern recorded on at least one servo track;

drive means for moving the storage medium relative to a head assembly;

a head assembly that is moved sufficiently close to a surface of the moving magnetic storage medium for reading the servo pattern recorded on the storage medium surface and for generating a pulse readback signal, the magnetic head assembly including at least one servo read head for reading the servo pattern on tracks of the storage medium;

a track information decoding circuit for receiving the pulsed readback signal produced by transducing the servo pattern and decoding the readback signal to produce bits of a binary track information signal, wherein the servo pattern comprises an automatic gain control (AGC) field of repeated first and second paired transitions having opposite polarity followed by one or more identification fields having opposite polarity paired transitions that represent bits of the track information signal and the readback signal includes an opposite polarity pulse pair corresponding to each opposite polarity transition pair of the servo pattern;

a servo control system for positioning the head assembly adjacent a surface of a storage medium for transducing a servo pattern comprising binary digits recorded in at least one track on the storage medium surface; and a translation assembly that is activated to position the head assembly relative to the storage medium;

wherein the servo control system includes:

preamplifier circuit that receives the pulsed readback signal and blocks the DC content of the signal and restores a predetermined signal baseline value so as to produce a conditioned readback signal;

an automatic gain control circuit that receives the conditioned readback signal and automatically adjusts the signal magnitude to maintain the conditioned readback signal substantially within a predetermined amplitude range and thereby produce a gain adjusted readback signal; and a pulse detector circuit that receives the gain adjusted readback signal, detects opposite polarity pulse pairs, and produces the bits of the track information signal such that the presence of an opposite polarity pulse pair results in a track information signal "one" bit and the absence of an opposite polarity pulse pair results in a track information signal "zero" bit, wherein the pulse detector circuit determines the polarity of the last readback signal pulse of the AGC field and produces a one bit if it detects a second pulse of a readback signal pulse pair having a magnitude greater than a predetermined threshold value and having a polarity that is the same as the last readback signal pulse of the AGC field which indicates it is the second pulse of the pulse pair regardless of the magnitude of the first pulse of the pulse pair, and otherwise produces a zero bit of the track information signal.

28. A data storage system as defined in claim 27, wherein the pulse detector circuit comprises:

a qualification circuit that receives the gain adjusted readback signal from the automatic gain control circuit, detects opposite polarity pulse pairs, and produces a pulse for each readback signal pulse of the first polarity and produces a pulse for each readback signal pulse of the second polarity; and a logic circuit that receives the pulses from the qualification circuit and produces a track information signal one bit only if it detects a pulse having the same polarity as that of the last readback signal pulse of the AGC field.

29. A data storage system as defined in claim 27, wherein the pulse detector circuit comprises:

a qualification circuit that receives the gain adjusted readback signal, detects opposite polarity pulse pairs, and produces a pulse for each readback signal pulse of the first polarity and produces a pulse for each readback signal pulse of the second polarity; and a logic circuit that receives the pulses from the qualification circuit and produces a track information signal one bit only if the detected pulse is the second pulse of a readback signal pulse pair.

30. A data storage system as defined in claim 27, wherein the pulse detector circuit comprises:

a qualification circuit that receives the gain adjusted readback signal, detects first and second opposite polarity pulse pairs, and produces a qualification pulse only if it detects that either the first or second pulse has a magnitude greater than a predetermined threshold value and has a polarity that is the same as that of the last readback signal pulse transduced from the AGC field; and a logic circuit that receives the qualification pulses from the qualification circuit and produces a track information signal one bit in response.

31. A data storage system as defined in claim 27, wherein the pulse detector circuit further includes:

a control circuit that produces the binary track information signal during an initial setup operating time interval by detecting a first polarity pulse of a readback signal pulse pair and a second polarity pulse of the readback signal pulse pair, decoding track information encoded in the readback signal according to the first polarity such that the presence of the first polarity pulse results in a track information signal "one" bit and the absence of the first polarity pulse results in a track information signal "zero" bit, decoding track information encoded in the readback signal according to the second polarity such that the presence of the second polarity pulse results in a track information signal "one" bit and the absence of the second polarity pulse results in a track information signal "zero" bit, determining an error count of decoding errors made according to the respective first polarity and second polarity, and selecting either the first polarity or the second polarity for subsequent pulse detector circuit processing in accordance with the readback signal pulse pair polarity that had the lesser determined error count.

* * * * *